United States Patent [19]

Kohda et al.

[11] Patent Number: 5,352,903

[45] Date of Patent: Oct. 4, 1994

[54] RADIATION IMAGE READ-OUT APPARATUS

[75] Inventors: Katsuhiro Kohda; Shigeru Saotome, both of Kanagawa, Japan

[73] Assignee: Fuji Photo Film Co., Ltd., Kanagawa, Japan

[21] Appl. No.: 208,380

[22] Filed: Mar. 10, 1994

[30] Foreign Application Priority Data

Mar. 11, 1993 [JP] Japan .................................. 5-050697

[51] Int. Cl.$^5$ .............................................. G01N 23/04
[52] U.S. Cl. .................................................. 250/586
[58] Field of Search .......................... 250/584, 585, 586

[56] References Cited

U.S. PATENT DOCUMENTS

| 4,737,641 | 4/1988 | Lange et al. | 250/585 |
| 4,749,861 | 6/1988 | Watanabe | 250/586 |
| 4,824,194 | 4/1989 | Karasawa | 250/586 |
| 4,950,907 | 8/1990 | Kuhn | 250/586 |
| 5,151,596 | 9/1992 | Saotome | 250/585 |

FOREIGN PATENT DOCUMENTS 9006538 6/1990 World Int. Prop. O. .......... 250/585

*Primary Examiner*—Paul M. Dzierzynski
*Assistant Examiner*—Drew A. Dunn
*Attorney, Agent, or Firm*—Sughrue, Mion, Zinn, Macpeak & Seas

[57] ABSTRACT

A radiation image read-out apparatus comprises a single light guide member constituted of a light guiding material. The light guide member comprises two input end faces for collecting light, which is emitted along a scanning line of stimulating rays and from two surfaces of a stimulable phosphor sheet having a radiation image stored thereon, and output end faces for radiating out the light, which has entered into the light guide member from the two input end faces. A single photodetector is located in close contact with the output end faces and photoelectrically detects the light radiated out of the light guide member. The input end faces of the light guide member comprise a first input end face for collecting the light, which is emitted from the front surface of the stimulable phosphor sheet, and a second input end face for collecting the light, which is emitted from the back surface of the stimulable phosphor sheet. The first and second input end faces of the light guide member stand facing the same scanning line.

5 Claims, 4 Drawing Sheets

F I G. 3A
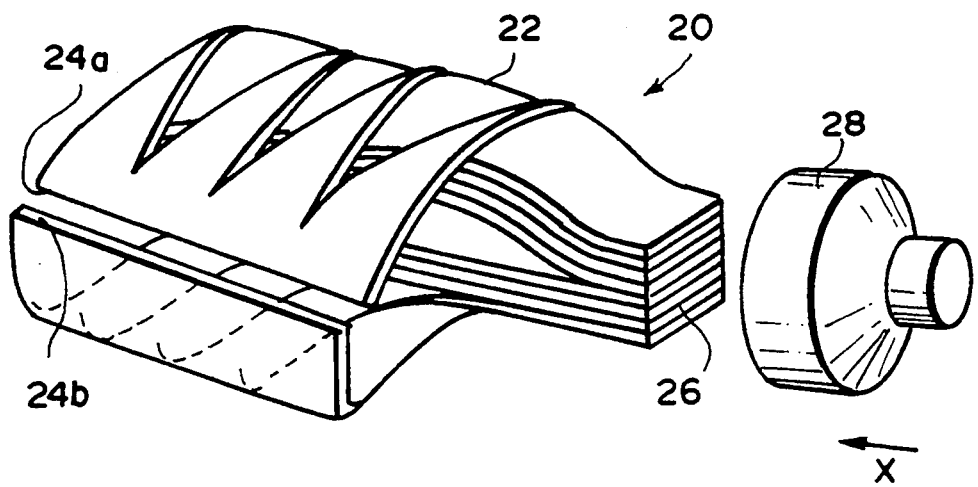
F I G. 3B
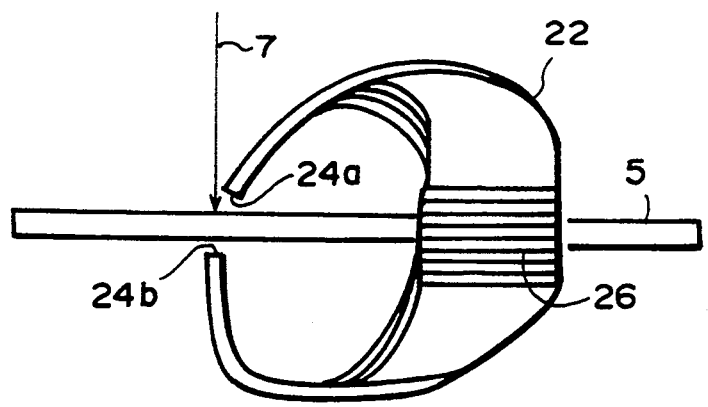
F I G. 4
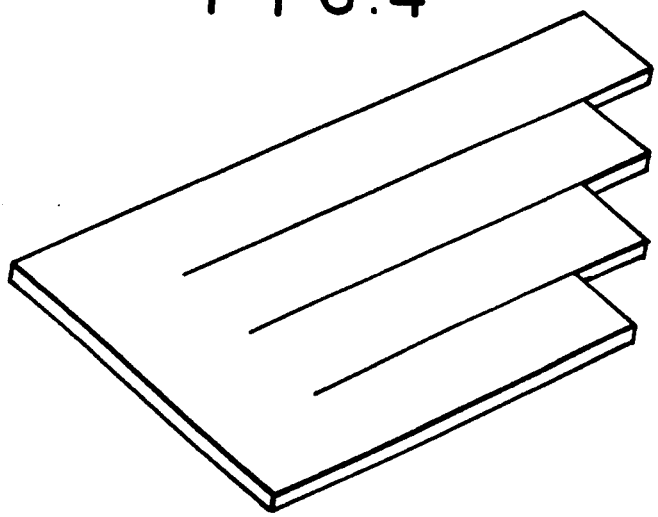

RADIATION IMAGE READ-OUT APPARATUS

BACKGROUND OF THE INVENTION

1. Field of the Invention

This invention relates to a radiation image read-out apparatus for reading out a radiation image from a stimulable phosphor sheet, on which the radiation image has been stored. This invention particularly relates to a radiation image read-out apparatus to be used in order to carry out an operation for reading out a radiation image, which has been stored on a stimulable phosphor sheet, from two surfaces of the stimulable phosphor sheet.

2. Description of the Prior Art

When certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays, such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a radiation image of an object, such as the human body, is stored on a sheet provided with a layer of the stimulable phosphor (hereinafter referred to as a stimulable phosphor sheet). The stimulable phosphor sheet is then scanned with stimulating rays, such as a laser beam, which cause it to emit light in proportion to the amount of energy stored thereon during its exposure to the radiation. The light emitted by the stimulable phosphor sheet when it is exposed to the stimulating rays is photoelectrically detected and converted into an electric image signal. The image signal is then processed and used during the reproduction of the radiation image of the object as a visible image, which has good image quality and can serve as an effective tool in, particularly, the efficient and accurate diagnosis of an illness. The ultimately obtained visible image may be reproduced as a hard copy or may be reproduced on a display device, such as a cathode ray tube (CRT) display device.

As a method for photoelectrically detecting light emitted by a stimulable phosphor sheet, a method has heretofore been known wherein a photoelectric read-out means for photoelectrically detecting the light emitted by the stimulable phosphor sheet is located only on the side of the stimulable phosphor sheet that is being scanned with the stimulating rays. The light emitted by one surface of the stimulable phosphor sheet is photoelectrically detected by the photoelectric read-out means. Also, a method for detecting light emitted by two surfaces of a stimulable phosphor sheet has been proposed in, for example, U.S. Pat. No. 4,346,295. With the proposed method for detecting light emitted by two surfaces of a stimulable phosphor sheet, two photoelectric read-out means are located on opposite sides of the stimulable phosphor sheet in order to photoelectrically detect the light emitted by the two surfaces of the stimulable phosphor sheet.

With the method for detecting light emitted by two surfaces of a stimulable phosphor sheet, a single radiation image is stored on the stimulable phosphor sheet, and the light emitted by two surfaces of the stimulable phosphor sheet is detected on the two sides of the stimulable phosphor sheet. Therefore, the efficiency, with which the light emitted by the stimulable phosphor sheet is guided and detected, can be kept high, and a high signal-to-noise (S/N) ratio can be obtained.

With the method for detecting light emitted by two surfaces of a stimulable phosphor sheet, which has been proposed in U.S. Pat. No. 4,346,295, the stimulable phosphor sheet is placed on a transparent holder, and two photoelectric read-out means (each of which comprises a combination of a light guide member and a photodetector) are respectively located above and below the holder. Specifically, the light emitted from the front surface of the stimulable phosphor sheet is detected by the photoelectric read-out means, which is located above the holder. Also, the light emitted from the back surface of the stimulable phosphor sheet is detected by the photoelectric read-out means, which is located below the holder.

However, with the aforesaid method for detecting light emitted by two surfaces of a stimulable phosphor sheet, the two photoelectric read-out means are respectively located on opposite sides of the stimulable phosphor sheet. Therefore, the apparatus for carrying out the method for detecting light emitted by two surfaces of a stimulable phosphor sheet cannot be kept small in size, and the cost of the apparatus cannot be kept low. Also, a large floor space is required to install the apparatus for carrying out the method for detecting light emitted by two surfaces of a stimulable phosphor sheet.

SUMMARY OF THE INVENTION

The primary object of the present invention is to provide a radiation image read-out apparatus, which is used in order to carry out an operation for reading out a radiation image from two surfaces of a stimulable phosphor sheet, and which is kept small in size.

Another object of the present invention is to provide a radiation image read-out apparatus, which is used in order to carry out an operation for reading out a radiation image from two surfaces of a stimulable phosphor sheet, and the cost of which is kept low.

The objects are accomplished by a radiation image read-out apparatus in accordance with the present invention, wherein an operation for reading out a radiation image, which has been stored on a stimulable phosphor sheet, from two surfaces of the stimulable phosphor sheet is carried out, and wherein only a single photoelectric read-out means is employed.

Specifically, the present invention provides a radiation image read-out apparatus, wherein a stimulable phosphor sheet, on which a radiation image has been stored, is scanned with stimulating rays, which cause the stimulable phosphor sheet to emit light in proportion to the amount of energy stored thereon during its exposure to radiation, the radiation image read-out apparatus comprising:

i) a single light guide member constituted of a light guiding material and comprising:

a) two input end faces for collecting the light, which is emitted along the scanning line of the stimulating rays and from two surfaces of the stimulable phosphor sheet, and b) output end faces for radiating out the light, which has entered into the light guide member from the two input end faces, and ii) a single photodetector, which is located such that it may be in close contact with the output end faces and may photoelectrically detect the light having been radiated out of the light guide member, wherein the input end faces of the light guide member comprise a first input end face for collecting the light, which is emitted from the front surface of the stimulable phosphor sheet, and a second input end face for collecting the light, which is emitted from the back surface of the stimulable phosphor sheet, and the first input end face and the second input end face of the light guide member stand facing the same scanning line.

The radiation image read-out apparatus in accordance with the present invention should preferably be embodied such that the input end faces of the light guide member may respectively stand facing the front surface and the back surface of the stimulable phosphor sheet, portions of the light guide member, which are adjacent to the output end faces, may extend towards a side of a conveyance path, along which the stimulable phosphor sheet is conveyed, and the output end faces of the light guide member may be located so as to be in close contact with the photodetector, which is located at a position outward from the conveyance path.

With the radiation image read-out apparatus in accordance with the present invention, the single light guide member is employed. The light guide member has the input end faces respectively located above and below the conveyance path, along which the stimulable phosphor sheet is conveyed, and the output end faces for transferring the light having entered into the light guide member to the single photodetector. Therefore, the size of the radiation image read-out apparatus can be kept small.

BRIEF DESCRIPTION OF THE DRAWINGS

FIG. 3A is a perspective view showing an embodiment of the radiation image read-out apparatus in accordance with the present invention, FIG. 3B is a side view taken from the direction indicated by the arrow X of FIG. 3A, which view serves as an aid in explaining how a light guide member employed in the embodiment of FIG. 3A collects light emitted by a stimulable phosphor sheet when the stimulable phosphor sheet is exposed to stimulating rays, FIG. 4 is a perspective view showing a light guiding material, which constitutes the light guide member employed in the embodiment of FIG. 3A.

DESCRIPTION OF THE PREFERRED EMBODIMENTS

The present invention will hereinbelow be described in further detail with reference to the accompanying drawings.

Figure 1:
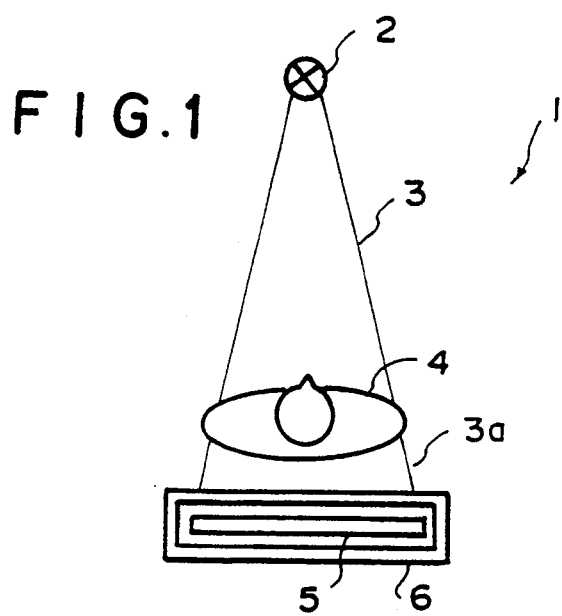
FIG. 1 is a schematic view showing an example of an X-ray image recording apparatus.

FIG. 1 is a schematic view showing an example of an X-ray image recording apparatus, which is used in order to record an X-ray image of an object on a stimulable phosphor sheet.

With reference to FIG. 1, an X-ray image recording apparatus 1 comprises an X-ray source 2 and a cassette 6, which houses a stimulable phosphor sheet 5 therein and which is located facing the X-ray source 2. An object 4 lies between the X-ray source 2 and the cassette 6. The stimulable phosphor sheet 5 comprises a substrate and two stimulable phosphor layers, which are respectively overlaid upon opposite surfaces of the substrate, such that an X-ray image stored on the stimulable phosphor sheet 5 may be read out from the two surfaces of the stimulable phosphor sheet 5. X-rays 3 are produced by the X-ray source 2 and irradiated to the object 4. X-rays 3a, which have passed through the object 4, impinge upon the stimulable phosphor sheet 5, which is housed in the cassette 6. In this manner, the X-ray image of the object 4 is stored on the stimulable phosphor sheet 5.

After the X-ray image has been stored on the stimulable phosphor sheet 5, the stimulable phosphor sheet 5 is taken out of the cassette 6 and subjected to the operation for reading out the X-ray image by an X-ray image read-out apparatus.

Figure 2:
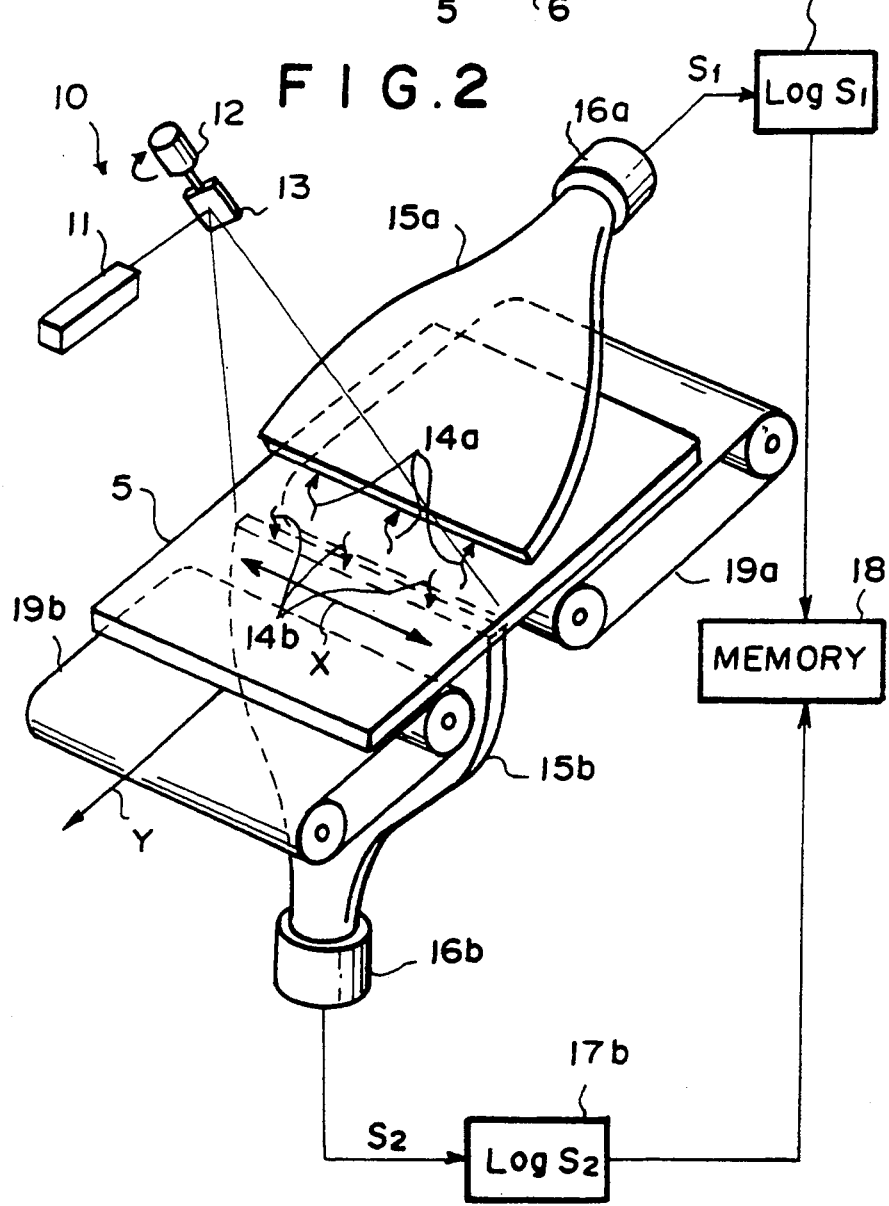
FIG. 2 is a schematic view showing an example of an X-ray image read-out apparatus.

FIG. 2 is a schematic view showing an example of an X-ray image read-out apparatus 10 for reading out the X-ray image, which has been stored on the stimulable phosphor sheet 5, from the two surfaces of the stimulable phosphor sheet 5.

With reference to FIG. 2, the stimulable phosphor sheet 5 is placed on endless belts 19a and 19b. The endless belts 19a and 19b are rotated by motors (not shown). A laser beam source 11, a rotating polygon mirror 13, and a motor 12 are located above the stimulable phosphor sheet 5. The laser beam source 11 produces a laser beam serving as stimulating rays, which cause the stimulable phosphor sheet 5 to emit light in proportion to the amount of energy stored thereon during its exposure to the X-rays. The rotating polygon mirror 13 reflects and deflects the laser beam, which has been produced by the laser beam source 11, such that the laser beam may scan the stimulable phosphor sheet 5 in main scanning directions. The motor 12 rotates the rotating polygon mirror 13. A light guide member 15a is located above and close to the position on the stimulable phosphor sheet 5 which is being scanned with the laser beam. The light guide member 15a collects light, which is emitted by the stimulable phosphor sheet 5 when it is scanned with the laser beam, from above the stimulable phosphor sheet 5. Also, a light guide member 15b is located below the position on the stimulable phosphor sheet 5 which is being scanned with the laser beam. The light guide member 15b is located perpendicularly to the stimulable phosphor sheet 5 and collects the light, which is emitted by the stimulable phosphor sheet 5 when it is scanned with the laser beam, from below the stimulable phosphor sheet 5. The light guide members 15a and 15b are located such that they may respectively be in close contact with photomultipliers 16a and 16b, which photoelectrically detects the light emitted by the stimulable phosphor sheet 5. The photomultipliers 16a and 16b are respectively connected to logarithmic amplifiers 17a and 17b. The logarithmic amplifiers 17a and 17b are connected to a memory 18.

How the X-ray image is read out from the stimulable phosphor sheet 5 in the X-ray image read-out apparatus 10 will be described hereinbelow with reference to FIG. 2. In the X-ray image recording apparatus 1 shown in FIG. 1, the X-ray image of the object is stored on the stimulable phosphor sheet 5. The stimulable phosphor sheet 5, on which the X-ray image has been stored, is set at a predetermined position on the endless belts 19a and 19b. The stimulable phosphor sheet 5, which has been set at the predetermined position, is conveyed by the endless belts 19a and 19b in a sub-scanning direction indicated by the arrow Y. Also, the laser beam is produced by the laser beam source 11. The laser beam, which has been produced by the laser beam source 11, is reflected and deflected by the rotating polygon mirror 13, which is quickly rotated by the motor 12 in the direction indicated by the arrow. The laser beam, which has thus been reflected and deflected by the rotating polygon mirror 13, impinges upon the stimulable phosphor sheet 5 and scans it in the main scanning directions indicated by the double headed arrow X. The main scanning directions are approximately normal to the sub-scanning direction indicated by the arrow Y. When the stimulable phosphor sheet 5 is exposed to the laser beam, the exposed portion of the stimulable phosphor sheet 5 emits light in proportion to the amount of energy stored thereon during its exposure to the X-rays. The light, which is emitted upwardly by the stimulable phosphor sheet 5, is represented by reference numeral 14a. The light, which is emitted downwardly by the stimulable phosphor sheet 5, is represented by reference numeral 14b. The emitted light 14a is guided by the light guide member 15a and photoelectrically detected by the photomultiplier 16a. The light guide member 15a is made from a light guiding material, such as an acrylic plate. The light guide member 15a has a linear input end face, which is located such that it may extend along the main scanning line on the stimulable phosphor sheet 5, and a ring-like output end face, which is located such that it may be in close contact with a light receiving face of the photomultiplier 16a. The emitted light 14a, which has entered from the input end face into the light guide member 15a, is guided through repeated total reflection inside of the light guide member 15a, emanates from the output end face, and is received by the photomultiplier 16a. The amount of the emitted light 14a representing the X-ray image is converted by the photomultiplier 16a into an electric signal. In the same manner as that described above, the emitted light 14b is guided by the light guide member 15b and is photoelectrically detected by the photomultiplier 16b.

The photomultiplier 16a generates an analog output signal S1. The analog output signal S1 is logarithmically amplified by the logarithmic amplifier 17a and is then fed into the memory 18. In the memory 18, the analog output signal S1 is converted by an A/D converter into a digital signal, and a first image signal is thereby obtained. Also, the photomultiplier 16b generates an analog output signal S2. The analog output signal S2 is logarithmically amplified by the logarithmic amplifier 17b and is then fed into the memory 18. In the memory 18, the analog output signal S2 is converted by an A/D converter into a digital signal, and a second image signal is thereby obtained. The first and second image signals are added to each other by a calculating means of the memory 18, and an ultimate image signal is thereby obtained. The level of the ultimate image signal is proportional to the logarithmic value of the amount of the light emitted by each picture element on the stimulable phosphor sheet 5. In this manner, the light emitted by the stimulable phosphor sheet 5 during its exposure to the stimulating rays is detected from the two surfaces of the stimulable phosphor sheet 5. Therefore, the efficiency, with which the light emitted by the stimulable phosphor sheet 5 is guided and detected, can be kept high, and an image having a high S/N ratio can be obtained ultimately.

With the X-ray image read-out apparatus as described above, the two light guide members 15a and 15b are respectively located on the front surface side and the back surface side of the stimulable phosphor sheet 5. Also, the photomultipliers 16a and 16b are located such that they may respectively be in close contact with the light guide members 15a and 15b. Further, the two image signals S1 and S2, which have been detected by the photomultipliers 16a and 16b, must be added to each other in the memory 18. Therefore, the conventional X-ray image read-out apparatus cannot be kept small in size and requires the means for adding the two image signals to each other.

The radiation image read-out apparatus in accordance with the present invention eliminates the aforesaid problems of the X-ray image read-out apparatus. With the radiation image read-out apparatus in accordance with the present invention, as described below, the light emitted from the front surface and the back surface of the stimulable phosphor sheet is collected by a single light guide member. Also, the light guided inside of the light guide member is detected by a single photodetector. Therefore, the size of the radiation image read-out apparatus in accordance with the present invention can be kept small. Also, a single image signal is obtained from the photodetector, which image signal represents the sum of the image information carried by the light emitted from the front surface of the stimulable phosphor sheet and the image information carried by the light emitted from the back surface of the stimulable phosphor sheet.

FIG. 3A is a perspective view showing an embodiment of the radiation image read-out apparatus in accordance with the present invention. FIG. 3B is a side view taken from the direction indicated by the arrow X of FIG. 3A, which view serves as an aid in explaining how a light guide member employed in the embodiment of FIG. 3A collects light emitted by a stimulable phosphor sheet when the stimulable phosphor sheet is exposed to stimulating rays.

Figure 5A:
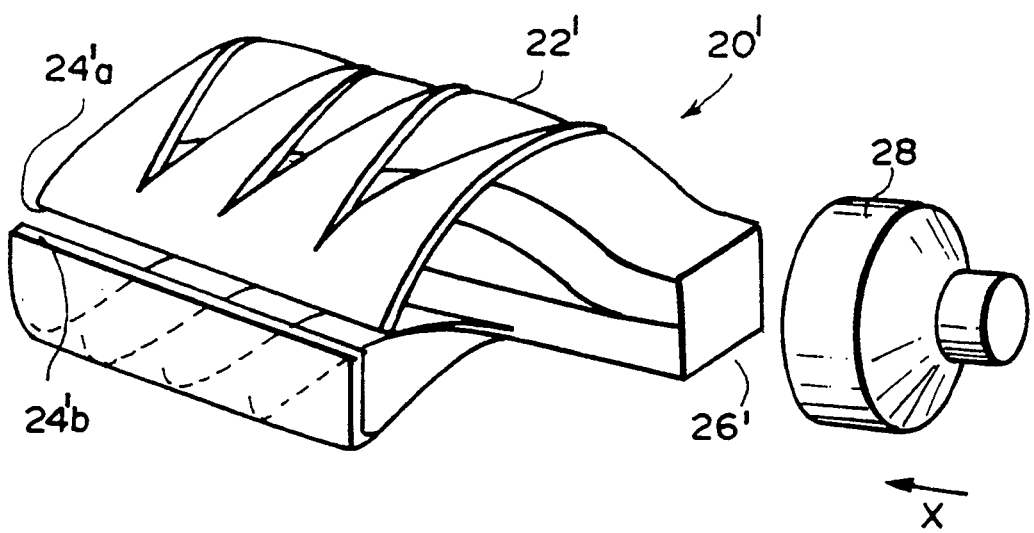
FIG. 5A is a perspective view showing a different embodiment of the radiation image read-out apparatus in accordance with the present invention.
Figure 5B:
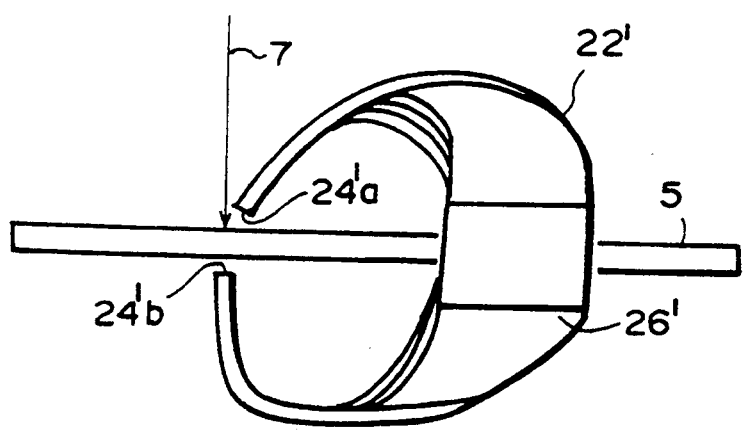
FIG. 5B is a side view taken from the direction indicated by the arrow X of FIG. 5A, which view serves as an aid in explaining how a light guide member employed in the embodiment of FIG. 5A collects light emitted by a stimulable phosphor sheet when the stimulable phosphor sheet is exposed to stimulating rays.

With reference to FIG. 3A, a radiation image read-out apparatus 20 in accordance with the present invention comprises a light guide member 22 and a photodetector 28. In FIG. 3A, the light guide member 22 and the photodetector 28 are illustrated such that they may be spaced apart from each other. However, actually, a combined output end face 26 of the light guide member 22 is located such that it may be in close contact with the photodetector 28. The light guide member 22 is constituted of a light guiding material. The light guide member 22 has two input end faces 24a and 24b and the combined output end face 26, which is formed by combining the output end face corresponding to the input end face 24a and the output end face corresponding to the input end face 24b such that the two output end faces may be flush with each other. Light, which has entered from the input end faces 24a and 24b into the light guide member 22, is transferred through the combined output end face 26 to the photodetector 28. The light guide member 22 can be manufactured by cutting a portion of a sheet-like light guiding material, which portion is to be adjacent to the combined output end face 26, into a plurality of strips, and bending the strips. FIG. 4 shows how the portion of the sheet-like light guiding material is cut into a plurality of strips. Two light guiding materials, the portions of which have been cut into the strips as shown in FIG. 4, are prepared, and the strips of the two light guiding materials are bent. Thereafter, the ends of the bent strips are adhered to one another such that the combined output end face 26 may be formed. In this manner, the light guide member 22 having the shape shown in FIG. 3A can be obtained. Alternatively, as illustrated in FIGS. 5A and 5B, a light guide member 22' may be manufactured with an integral molding process from a light guiding material such that it may have two input end faces 24'a and 24'b and a combined output end face 26'. The photodetector 28 may be constituted of a photomultiplier, or the like.

How the light emitted by a stimulable phosphor sheet 5, on which a radiation image has been stored, is detected will be described hereinbelow with reference to FIG. 3B. The light, which is emitted from the front surface of the stimulable phosphor sheet 5 when the stimulable phosphor sheet 5 is scanned with stimulating rays 7, is collected through the input end face 24a into the light guide member 22. Also, the light, which is emitted from the back surface of the stimulable phosphor sheet 5, is collected through the input end face 24b into the light guide member 22. The light, which has entered into the light guide member 22, is guided through repeated total reflection inside of the light guide member 22, which is constituted of the light guiding material, to the combined output end face 26. The guided light emanates from the combined output end face 26 and is transferred to the single photodetector 28 (not shown in FIG. 3B). In this manner, the sum of the light, which is emitted from the front surface of the stimulable phosphor sheet 5, and the light, which is emitted from the back surface of the stimulable phosphor sheet 5, is transferred to the photodetector 28. Therefore, with the radiation image read-out apparatus in accordance with the present invention, a particular means for adding two electric signals detected by two photodetectors need not be used.

Figure 6A:
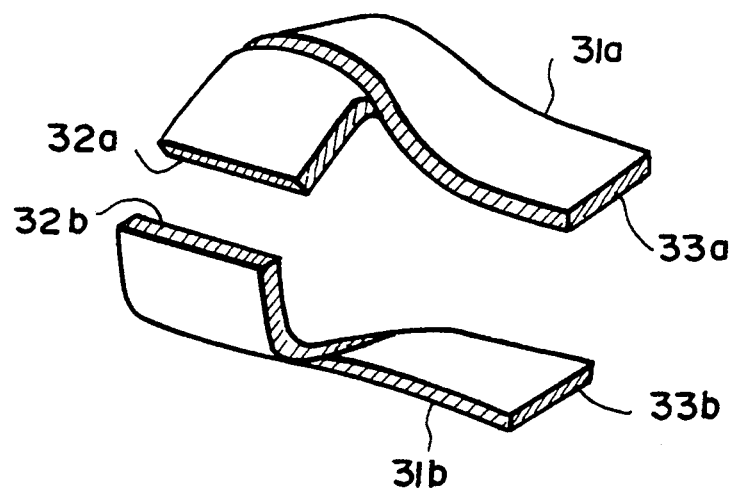
FIGS. 6A, 6B, and 6C are perspective views showing different examples of light guide members, which are employed in further different embodiments of the radiation image read-out apparatus in accordance with the present invention.
Figure 6B:
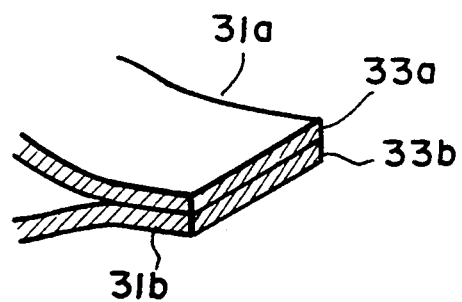
Figure 6C:
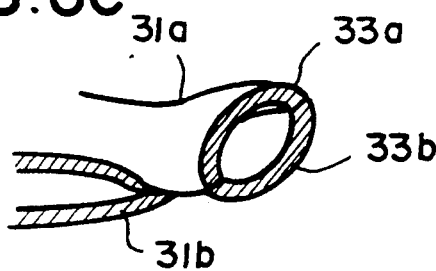

FIGS. 6A, 6B, and 6C are perspective views showing different examples of light guide members, which are employed in further different embodiments of the radiation image read-out apparatus in accordance with the present invention. In FIG. 6A, a light guide member part 31a for the front surface of the stimulable phosphor sheet and a light guide member part 31b for the back surface of the stimulable phosphor sheet are illustrated in the separated state. The light guide member part 31a has an input end face 32a for collecting the light, which is emitted from the front surface of the stimulable phosphor sheet, and an output end face 33a for radiating out the light having been guided through the light guide member part 31a. The light guide member part 31b has an input end face 32b for collecting the light, which is emitted from the back surface of the stimulable phosphor sheet, and an output end face 33b for radiating out the light having been guided through the light guide member part 31b. When the light guide member parts 31a and 31b are used in order to detect light, as illustrated in FIG. 6B, the portion of the light guide member part 31a, which portion is adjacent to the output end face 33a, and the portion of the light guide member part 31b, which portion is adjacent to the output end face 33b, are overlaid one upon the other and combined together. Alternatively, as illustrated in FIG. 6C, the portion of the light guide member part 31a, which portion is adjacent to the output end face 33a, and the portion of the light guide member part 31b, which portion is adjacent to the output end face 33b, may be rounded and combined with each other.

The light guide member employed in the radiation image read-out apparatus in accordance with the present invention should preferably be constructed such that the input end faces may respectively stand facing the front surface and the back surface of the stimulable phosphor sheet, the portions, which are adjacent to the output end faces, may extend towards a side of the conveyance path, along which the stimulable phosphor sheet is conveyed, and the output end faces may be located so as to be in close contact with the photodetector, which is located at the position outward from the conveyance path.

In the embodiments described above, the output end faces of the light guide member corresponding to the two input end faces are combined together. However, the output end faces of the light guide member corresponding to the two input end faces need not necessarily be combined together. The output end faces of the light guide member may be separated from each other and located such that they may be in close contact with a single photodetector.

It should be understood that the radiation image read-out apparatus in accordance with the present invention can be embodied in various other ways, wherein input end faces of a light guide member comprise a first input end face for collecting the light, which is emitted from the front surface of a stimulable phosphor sheet, and a second input end face for collecting the light, which is emitted from the back surface of the stimulable phosphor sheet, wherein the first input end face and the second input end face of the light guide member stand facing the same scanning line of stimulating rays, and wherein output end faces of the light guide member are located such that they may be in close contact with a single photodetector.

What is claimed is:

1. A radiation image read-out apparatus, wherein a stimulable phosphor sheet, on which a radiation image has been stored, is scanned with stimulating rays, which cause the stimulable phosphor sheet to emit light in proportion to the amount of energy stored thereon during its exposure to radiation, the radiation image read-out apparatus comprising:

i) a single light guide member constituted of a light guiding material and comprising;
      a) two input end faces for collecting the light, which is emitted along the scanning line of the stimulating rays and from two surfaces of said stimulable phosphor sheet, and
      b) output end faces for radiating out the light, which has entered into said light guide member from the two input end faces, and
   ii) a single photodetector, which is located in close contact with the output end faces and photoelectrically detects the light having been radiated out of said light guide member, wherein the input end faces of said light guide member comprise a first input end face for collecting the light, which is emitted from the front surface of said stimulable phosphor sheet, and a second input end face for collecting the light, which is emitted from the back surface of said stimulable phosphor sheet, and the first input end face and the second input end face of said light guide member stand facing the same scanning line.

2. An apparatus as defined in claim 1 wherein the input end faces of said light guide member respectively stand facing the front surface and the back surface of said stimulable phosphor sheet, portions of said light guide member, which are adjacent to the output end faces, extend towards a side of a conveyance path, along which said stimulable phosphor sheet is conveyed, and the output end faces of said light guide member are located in close contact with said photodetector, which is located at a position outward from the conveyance path.

3. An apparatus as defined in claim 1 wherein portions of said light guide member, which are adjacent to the output end faces, are cut into a plurality of strips, the strips are bundled, and end faces of the bundled strips, which end faces constitute the output end faces, are located in close contact with said photodetector.

4. An apparatus as defined in claim 1 wherein the output end faces of said light guide member are combined with each other such that they are flush with each other and forms a single combined output end face, and the single combined output end face is located in close contact with said photodetector.

5. An apparatus as defined in claim 1 wherein said stimulating rays are a laser beam.

* * * * *